(12) United States Patent
Ochiai et al.

(10) Patent No.: US 12,063,931 B2
(45) Date of Patent: *Aug. 20, 2024

(54) AQUEOUS SUSPENSION-FORM PESTICIDAL COMPOSITION

(71) Applicant: Mitsui Chemicals Crop & Life Solutions, Inc., Tokyo (JP)

(72) Inventors: Kazuko Ochiai, Yokohama (JP); Tomohiko Okuda, Yokohama (JP); Atsushi Sato, Yokohama (JP)

(73) Assignee: MITSUI CHEMICALS CROP & LIFE SOLUTIONS, INC., Tokyo (JP)

( * ) Notice: Subject to any disclaimer, the term of this patent is extended or adjusted under 35 U.S.C. 154(b) by 641 days.

This patent is subject to a terminal disclaimer.

(21) Appl. No.: 17/268,315

(22) PCT Filed: Sep. 27, 2019

(86) PCT No.: PCT/JP2019/038095
§ 371 (c)(1),
(2) Date: Feb. 12, 2021

(87) PCT Pub. No.: WO2020/067404
PCT Pub. Date: Apr. 2, 2020

(65) Prior Publication Data
US 2021/0345612 A1 Nov. 11, 2021

(30) Foreign Application Priority Data
Sep. 27, 2018 (JP) .................. 2018-181698

(51) Int. Cl.
*A01N 43/40* (2006.01)
*A01N 25/04* (2006.01)
*A01N 25/24* (2006.01)

(52) U.S. Cl.
CPC ............. *A01N 43/40* (2013.01); *A01N 25/04* (2013.01); *A01N 25/24* (2013.01)

(58) Field of Classification Search
CPC ......... A01N 43/40; A01N 25/04; A01N 25/24
See application file for complete search history.

(56) References Cited

U.S. PATENT DOCUMENTS

| 2013/0150414 A1 | 6/2013 | Kagabu et al. |
| 2016/0316744 A1 | 11/2016 | Lu et al. |
| 2018/0360032 A1 | 12/2018 | Lu et al. |

FOREIGN PATENT DOCUMENTS

| EP | 1 090 551 A1 | 4/2001 |
| JP | 05-043401 A | 2/1993 |
| JP | 08-034702 A | 2/1996 |
| TW | 200820900 A | 5/2008 |
| TW | 201112949 A | 4/2011 |
| WO | 99/66792 A1 | 12/1999 |
| WO | 2011/030806 A1 | 3/2011 |
| WO | 2012/029672 A1 | 3/2012 |
| WO | 2015/089787 A1 | 6/2015 |
| WO | 2017/115782 A1 | 7/2017 |

OTHER PUBLICATIONS

Nissan Chemical. Google Patent Machine Translation of JP-3525499-B2. May 2004 pp. 1-12 (Year: 2004).*
S. Rosalam, R. England, Review of xanthan gum production from unmodified starches by *Xanthomonas comprestris* sp., Enzyme and Microbial Technology, vol. 39, Issue 2, 2006, pp. 197-207, ISSN 0141-0229, https://doi.org/10.1016/j.enzmictec.2005.10.019. (Year: 2006).*
Horikoshi R. Google Patent Machine Translation of WO-2017115782-A1. Jul. 2017 pp. 1-24 (Year: 2017).*
Extended European Search Report, dated May 30, 2022, issued by the European Patent Office in European Application No. 19867511.8.
Communication, dated Apr. 8, 2021, issued by the International Bureau in International Application No. PCT/JP2019/038095.
"Flowable", Noyaku Seizai Guide (Guide for Pesticidal Formulation), edited by Noyaku Seizai/Seyoho Kenkyukai, (Special Committee on Agricultural Formulation and Application) of the Pesticide Science Society of Japan, the Japan Plant Protection Association 1997, pp. 35.
International Search Report for PCT/JP2019/038095, dated Dec. 24, 2019.
Office Action dated Nov. 23, 2022 issued by the Taiwanese Patent Office in Taiwanese Application No. 108135027.

* cited by examiner

*Primary Examiner* — Noble E Jarrell
*Assistant Examiner* — Richard Grant Peckham
(74) *Attorney, Agent, or Firm* — Sughrue Mion, PLLC

(57) ABSTRACT

An aqueous suspension-form pesticidal composition comprising: at least one pesticidal active ingredient selected from the group consisting of amine derivatives represented by the following general formula (1) and salts thereof; a highly-purified and partially-desulfonated lignosulfonate; and an aqueous dispersion medium

[Chemical Formula 1]

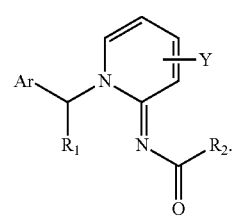

(1)

7 Claims, No Drawings

AQUEOUS SUSPENSION-FORM PESTICIDAL COMPOSITION

CROSS REFERENCE TO RELATED APPLICATIONS

This application is a National Stage of International Application No. PCT/JP2019/038095 filed Sep. 27, 2019, claiming priority based on Japanese Patent Application No. 2018-181698 filed Sep. 27, 2018.

TECHNICAL FIELD

The present invention relates to an aqueous suspension-form pesticidal composition.

BACKGROUND ART

In order to apply a small amount of pesticidal active ingredient as a pesticide appropriately and economically to a wide field, it is important to select a dosage form suitable for the type and properties of the pesticidal active ingredient. An aqueous suspension-form pesticidal formulation is also called a flowable formulation, and is a dosage form in which particles of a solid pesticidal active ingredient are suspended in water. The pesticidal active ingredient is finely ground to prevent sedimentation, or to make it possible to easily spray the formulation without clogging the nozzle in a practical situation where the formulation is diluted with water and sprayed on a field, and the particle diameter is generally 15 µm or less. Since the aqueous suspension-form pesticidal formulation uses water, it is highly safe, free from concerns of flammability and odor, easy to store, and provides a safe working environment (Noyaku Seizai Guide (Guide for Pesticidal Formulation), edited by Noyaku Seizai/Seyoho Kenkyukai (Special Committee on Agricultural Formulation and Application) of the Pesticide Science Society of Japan, the Japan Plant Protection Association (1997), p. 35 (NPL 1)).

On the other hand, examples of other dosage forms of conventionally used pesticides include emulsions, but their basic composition includes pesticidal active ingredients, organic solvents, and emulsifiers. Those emulsions can be produced inexpensively because they can be prepared only by mixing and dissolving pesticidal active ingredients and other raw materials. However, social demands such as stricter regulations for safety to humans and animals as well as the environment have been increasing in recent years, and there is a tendency to shift from emulsions containing organic solvents to aqueous suspension-form formulations.

However, since the aqueous suspension-form pesticidal formulation contains a pesticidal active ingredient in the form of particles as described above, there is a possibility that the particles may grow in size during storage or preservation, and physical stability and efficacy may deteriorate. In an aqueous suspension-form pesticidal formulation having particles of pesticidal active ingredient suspended in water, the pesticidal active ingredient may be hydrolyzed in water, or the pesticidal active ingredient deteriorates in dispersibility in water or in redispersibility at the time of sedimentation, resulting in caking. Therefore, in the case of aqueous suspension-form pesticides, it has been attempted to blend a dispersant such as a lignosulfonate, a surfactant, and the like in order to achieve stabilization (Japanese Unexamined Patent Application Publication NO. Hei 5-43401 (PTL 1) and International Publication No. WO99/66792 (PTL 2)).

In addition, International Publication No. WO2012/029672 (PTL 3) describes, as a pesticidal active ingredient, a compound containing an amine derivative represented by the following general formula (1) or a salt thereof, for example.

CITATION LIST

Patent Literature

[PTL 1] Japanese Unexamined Patent Application Publication NO. Hei 5-43401
[PTL 2] International Publication No. WO99/66792
[PTL 3] International Publication No. WO2012/029672

Non Patent Literature

[NPL 1] Noyaku Seizai Guide (Guide for Pesticidal Formulation), edited by Noyaku Seizai/Seyoho Kenkyukai (Special Committee on Agricultural Formulation and Application) of the Pesticide Science Society of Japan, the Japan Plant Protection Association (1997), p. 35

SUMMARY OF INVENTION

Technical Problem

The amine derivative or the salt thereof described in PTL 3 is a compound excellent in pest control effect. However, the present inventors examined an aqueous suspension-form pesticidal composition containing the amine derivative and/or the salt thereof as a pesticidal active ingredient, and have found that, since the compound is particularly likely to aggregate in water to grow in particle diameter and the pest control effect may be reduced accordingly, there may be a problem in the stability over time of the formulation. Meanwhile, the present inventors have also found that it is difficult to maintain sufficient stability over time even in the case of blending a dispersant as described in PTL 1 or PTL 2.

The present invention has been made in view of the above problems, and aims to provide an aqueous suspension-form pesticidal compos it ion which is excellent in pest control effect and which sufficiently suppresses particle diameter growth of the pesticidal active ingredient and reduction of the pest control effect and thus is excellent in stability over time.

Solution to Problem

The present inventors have made earnest studies to achieve the above object, and have found as a result that, when an aqueous suspension-form pesticidal composition is blended with a combination of a specific amine derivative or a salt thereof and a highly-purified and partially-desulfonated lignosulfonate, the stability over time can be particularly improved by sufficiently suppressing the particle diameter growth of the amine derivative and/or the salt thereof while sufficiently maintaining its excellent pest control effect. This finding has led to the completion of the present invention.

Specifically, the present invention provides the following aspects.

[1]
An aqueous suspension-form pesticidal composition comprising:
- at least one pesticidal active ingredient selected from the group consisting of amine derivatives represented by the following general formula (1) and salts thereof;
- a highly-purified and partially-desulfonated lignosulfonate; and
- an aqueous dispersion medium

[Chemical Formula 1]

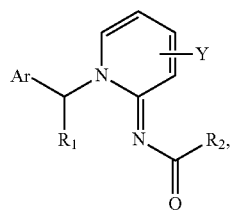

(1)

[In the general formula (1),
Ar represents a pyridyl group optionally substituted with a halogen atom, a C1-6 alkyl group optionally substituted with a halogen atom, a C1-6 alkyloxy group optionally substituted with a halogen atom, a hydroxyl group, a cyano group, or a nitro group; or a pyrimidyl group optionally substituted with a halogen atom, a C1-6 alkyl group optionally substituted with a halogen atom, a C1-6 alkyloxy group optionally substituted with a halogen atom, a hydroxyl group, a cyano group, or a nitro group,
$R_1$ represents a hydrogen atom or a C1-6 alkyl group,
Y represents a hydrogen atom, a halogen atom, a hydroxyl group, a C1-6 alkyl group optionally substituted with a halogen atom, a C1-6 alkyloxy group optionally substituted with a halogen atom a cyano group, a formyl group, or a nitro group, and
$R_2$ represents a C1-6 alkyl group substituted with a halogen].

[2]
The aqueous suspension-form pesticidal composition according to [1] described above, wherein
the amine derivative is at least one selected from the group consisting of
N-[1-((6-chloropyridin-3-yl)methyl)pyridin-2(1H)-ylidene]-2,2,2-trifluoroacetamide,
N-[1-((6-chloro-5-fluoropyridin-3-yl)methyl)pyridin-2(1H)-ylidene]-2,2,2-trifluoroacetamide,
N-[1-((6-fluoropyridin-3-yl)methyl)pyridin-2(1H)-ylidene]-2,2,2-trifluoroacetamide,
N-[1-((6-bromopyridin-3-yl)methyl)pyridin-2(1H)-ylidene]-2,2,2-trifluoroacetamide,
N-[1-(1-(6-chloropyridin-3-yl)ethyl)pyridin-2(1H)-ylidene]-2,2,2-trifluoroacetamide,
N-[1-((6-chloropyridin-3-yl)methyl)pyridin-2(1H)-ylidene]-2,2-difluoroacetamide,
2-chloro-N-[1-((6-chloropyridin-3-yl)methyl)pyridin-2(1H)-ylidene]-2,2-difluoroacetamide,
N-[1-((2-chloropyrimidin-5-yl)methyl)pyridin-2(1H)-ylidene]-2,2,2-trifluoroacetamide, and
N-[1-((6-chloropyridin-3-yl)methyl)pyridin-2(1H)-ylidene]-2,2,3,3,3-pentafluoropropanamide.

[3]
The aqueous suspension-form pesticidal composition according to [1] described above, wherein
an amount of the highly-purified and partially-desulfonated lignosulfonate blended is 1 to 5% by weight.

[4]
The aqueous suspension-form pesticidal composition according to anyone of [1] to [3] described above, further comprising a thickener.

[5]
The aqueous suspension-form pesticidal composition according to [4] described above, wherein
the thickener is at least one selected from the group consisting of xanthan gum, guar gum, carrageenans, carboxymethyl cellulose, polyvinyl pyrrolidone, and carboxyvinyl polymers.

Advantageous Effects of Invention

The present invention makes it possible to provide an aqueous suspension-form pesticidal composition which is excellent in pest control effect and which sufficiently suppresses particle diameter growth of the pesticidal active ingredient and reduction of the pest control effect and thus is excellent in stability over time.

DESCRIPTION OF EMBODIMENTS

Hereinafter, the present invention is described in detail with reference to its preferred embodiments.

An aqueous suspension-form pesticidal composition of the present invention comprises: at least one pesticidal active ingredient selected from the group consisting of amine derivatives represented by the following general formula (1) and salts thereof; a highly-purified and partially-desulfonated lignosulfonate; and an aqueous dispersion medium

[Chemical Formula 2]

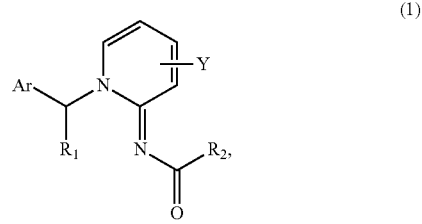

(1)

In the general formula (1),
Ar represents a pyridyl group optionally substituted with a halogen atom, a C1-6 alkyl group optionally substituted with a halogen atom, a C1-6 alkyloxy group optionally substituted with a halogen atom, a hydroxyl group, a cyano group, or a nitro group; or a pyrimidyl group optionally substituted with a halogen atom, a C1-6 alkyl group optionally substituted with a halogen atom, a C1-6 alkyloxy group optionally substituted with a halogen atom, a hydroxyl group, a cyano group, or a nitro group,
$R_1$ represents a hydrogen atom or a 01-6 alkyl group,
Y represents a hydrogen atom, a halogen atom, a hydroxyl group, a C1-6 alkyl group optionally substituted with a halogen atom, a C1-6 alkyloxy group optionally substituted with a halogen atom a cyano group, a formyl group, or a nitro group, and R₂ represents a C1-6 alkyl group substituted with a halogen.

The aqueous suspension-form pesticidal composition of the present invention contains, as a pesticidal active ingredient, at least one selected from the group consisting of amine derivatives represented by the general formula (1) and salts thereof (in this specification, sometimes referred to as "an amine derivative and/or a salt thereof").

In the general formula (1), examples of the "halogen atom" each independently include a chlorine atom, a fluorine atom, a bromine atom, and an iodine atom.

In addition, examples of the "C1-6 alkyl group optionally substituted with a halogen atom" each independently include a methyl group, an ethyl group, an n-propyl group, an isopropyl group, an n-butyl group, an n-pentyl group, a difluoromethyl group, a trifluoromethyl group, a chloromethyl group, a 2-trifluoroethyl group, and a 2-chloroethyl group.

In addition, examples of the "C1-6 alkyloxy group optionally substituted with a halogen atom" each independently include a methoxy group, an ethoxy group, an isopropyloxy group, and a trifluoromethoxy group.

In addition, examples of the "pyridyl group optionally substituted" with a halogen atom, a C1-6 alkyl group optionally substituted with a halogen atom, a C1-6 alkyloxy group optionally substituted with a halogen atom, a hydroxyl group, a cyano group, or a nitro group include a 6-chloro-3-pyridyl group, a 6-chloro-5-fluoro-3-pyridyl group, a 6-bromo-3-pyridyl group, a 6-fluoro-3-pyridyl group, 5,6-dichloro-3-pyridyl group, and a 6-trifluoromethyl-3-pyridyl group.

In addition, examples of the "pyrimidyl group optionally substituted" with a halogen atom, a C1-6 alkyl group optionally substituted with a halogen atom, a C1-6 alkyloxy group optionally substituted with a halogen atom, a hydroxyl group, a cyano group, or a nitro group include a 2-methyl-5-pyrimidyl group, a 2-chloro-5-pyrimidyl group, a 2-fluoro-5-pyrimidyl group, a 2-chloro-5-pyrimidyl group, a 2-bromo-5-pyrimidyl group, a 4-chloro-5-pyrimidyl group, a 5-chloro-2-pyrimidyl group, a 2,4-dichloro-5-pyrimidyl group, and a 2,4-dimethyl-5-pyrimidyl group.

In addition, in the present invention, the "C1-6 alkyl group" includes a linear or branched alkyl group having 1 to 6 carbon atoms (C1-6). Examples of the "C1-6 alkyl group" each independently include a methyl group, an ethyl group, a propyl group, a butyl group, a pentyl group, a hexyl group, an isopropyl group, an isobutyl group, an isopentyl group, an isohexyl group, a sec-butyl group, a tert-butyl group, a sec-pentyl group, a 3-pentyl group, a tert-pentyl group, a sec-hexyl group, a 2-hexyl group, and a tert-hexyl group.

In addition, examples of the "C1-6 alkyl group substituted with a halogen" include a difluoromethyl group, a trifluoromethyl group, a chloromethyl group, a 2-trifluoroethyl group, and a 2-chloroethyl group.

In the aqueous suspension-form pesticidal composition of the present invention, the amine derivative represented by the general formula (1) is preferably at least one selected from the group consisting of N-[1-((6-chloropyridin-3-yl)methyl)pyridin-2(1H)-ylidene]-2,2,2-trifluoroacetamide, N-[1-((6-chloro-5-fluoropyridin-3-yl)methyl)pyridin-2(1H)-ylidene]-2,2,2-trifluoroacetamide, N-[1-((6-fluoropyridin-3-yl)methyl)pyridin-2(1H)-ylidene]-2,2,2-trifluoroacetamide, N-[1-((6-bromopyridin-3-yl)methyl)pyridin-2(1H)-ylidene]-2,2,2-trifluoroacetamide, N-[1-(1-(6-chloropyridin-3-yl)ethyl)pyridin-2(1H)-ylidene]-2,2,2-trifluoroacetamide, N-[1-((6-chloropyridin-3-yl)methyl)pyridin-2(1H)-ylidene]-2,2-difluoroacetamide, 2-chloro-N-[1-((6-chloropyridin-3-yl)methyl)pyridin-2(1H)-ylidene]-2,2-difluoroacetamide, N-[1-((2-chloropyrimidin-5-yl)methyl)pyridin-2(1H)-ylidene]-2,2,2-trifluoroacetamide, and N-[1-((6-chloropyridin-3-yl)methyl)pyridin-2(1H)-ylidene]-2,2,3,3,3-pentafluoropropanamide. Moreover, among the above, the amine derivative represented by the general formula (1) is particularly preferably N-[1-((6-chloropyridin-3-yl)methyl)pyridin-2(1H)-ylidene]-2,2,2-trifluoroacetamide.

In the aqueous suspension-form pesticidal composition of the present invention, the pesticidal active ingredient is preferably contained in the form of solid particles. The average particle diameter of the pesticidal active ingredient is in a range of preferably 1 to 5 μm and in a range of more preferably 1.5 to 4.5 μm as a volume average particle diameter in water measured by a laser diffraction type particle diameter distribution measuring apparatus. The laser diffraction type particle diameter distribution measuring apparatus is not particularly limited, and it is possible to use, for example, "SALD-2200 manufactured by Shimadzu Corporation" or the like.

Although the content of the pesticidal active ingredient in the aqueous suspension-form pesticidal composition of the present invention is not particularly limited, the content of the amine derivative and/or the salt thereof (amount of the amine derivative represented by the general formula (1) or the salt thereof in terms of free form, or the total amount of them when both are contained, and the same applies hereinafter) is 1 to 80% by weight, preferably 5 to 50% by weight, and more preferably 10 to 40% by weight relative to 100% by weight of the total weight of the aqueous suspension-form pesticidal composition.

The aqueous suspension-form pesticidal composition of the present invention contains a highly-purified and partially-desulfonated lignosulfonate as a dispersant.

Here, in the present invention, the "highly-purified and partially-desulfonated lignosulfonate" is a lignosulfonate subjected to a reaction under the condition of alkaline high-temperature and pressure and subsequent purification (desugaring), and refers to a lignosulfonate which does not contain reducing sugars (high purity) and in which some of the sulfone groups have been eliminated (partially desulfonated). The highly-purified and partially-desulfonated lignosulfonate can be obtained by, for example, reacting an eluate of sulfite pulp serving as a raw material under the condition of alkaline high-temperature and pressure, subjecting the lignosulfonate as the main component to hydrolyzation reaction, oxidation reaction, desulfonation reaction, demethylation reaction, and the like under the condition of alkaline high-temperature and pressure, and purifying the resultant.

In the highly-purified and partially-desulfonated lignosulfonate according to the present invention, highly-purified, that is, "does not contain reducing sugars" means that the lignosulfonate is substantially free of reducing sugars such as monosaccharides such as glucose, fructose, and glyceraldehyde, and maltose-type disaccharides and oligosaccharides such as lactose, arabinose, and maltose, and more specifically means that the amount of reducing sugar is not detected (negative) by quantification with Fehling's reagent.

In the highly-purified and partially-desulfonated lignosulfonate according to the present invention, partially desulfonated, that is, "some of the sulfone groups have been eliminated" means that some of the sulfone groups of the lignosulfonate have been desulfonated, and more specifically means that the degree of sulfonation is preferably in a range of 0.3 to 1.0. The degree of sulfonation can be determined by nuclear magnetic resonance (NMR) for measuring C and H signals of benzene rings to which sulfone groups are bonded. In addition, in the highly-purified and partially-desulfonated lignosulfonate according to the present invention, the content of sulfur atoms is preferably 2.1 to 2.6% by mass.

The highly-purified and partially-desulfonated lignosulfonate may be any agriculturally and horticulturally acceptable salt, and examples thereof include sodium, calcium, and magnesium salts, among which sodium salt is preferable.

In addition, the highly-purified and partially-desulfonated lignosulfonate according to the present invention has a weight average molecular weight (MW, the weight average molecular weight in terms of polystyrene by gel permeation chromatography (GPC), hereinafter the same) of preferably 4,500 to 16,000.

As the highly-purified and partially-desulfonated lignosulfonate contained in the aqueous suspension-form pesticidal composition of the present invention, one kind may be used alone, or a mixture of two or more kinds may be used, as long as the above conditions are satisfied, and a commercially available product may be used appropriately. Specific examples of the commercially available product include VANILLEX G (manufactured by NIPPON PAPER INDUSTRIES CO., LTD.), VANILLEX HW (manufactured by NIPPON PAPER INDUSTRIES CO., LTD.), VANILLEX N (manufactured by NIPPON PAPER INDUSTRIES CO., LTD.), VANILLEX RN (manufactured by NIPPON PAPER INDUSTRIES CO., LTD.), New Kargen RX-B (manufactured by TAKEMOTO OIL & FAT Co., Ltd.), and New Kargen RX-C (manufactured by TAKEMOTO OIL & FAT Co., Ltd.), and one of them may be used alone, or two or more thereof may be mixed and used.

The content (blending amount) of the highly-purified and partially-desulfonated lignosulfonate in the aqueous suspension-form pesticidal composition of the present invention (when the highly-purified and partially-desulfonated lignosulfonate is a mixture of two or more kinds, the total amount of them, and the same applies hereinafter) is preferably 0.5 to 6% by weight and more preferably 1 to 5% by weight relative to the total weight of the aqueous suspension-form pesticidal composition. When the content is less than the lower limit, there is a tendency that the dispersibility in water is insufficient, the pesticidal active ingredient settles, and the redispersibility also deteriorates. On the other hand, even when the content exceeds the upper limit, further improvement of effects cannot be expected, which is not preferable from the economical aspect.

The present invention can provide, when the amine derivative and/or the salt thereof is combined with the highly-purified and partially-desulfonated lignosulfonate, an aqueous suspension-form pesticidal composition which has particularly excellent dispersibility and in which aggregation and particle diameter growth of the amine derivative and/or salt thereof due to change over time are sufficiently suppressed.

The ratio of the content of the amine derivative and/or the salt thereof to the content of the highly-purified and partially-desulfonated lignosulfonate in the aqueous suspension-form pesticidal composition of the present invention (content of pesticidal active ingredient:content of highly-purified and partially-desulfonated lignosulfonate) is preferably 10:0.5 to 10:5 in weight ratio. When the content of the highly-purified and partially-desulfonated lignosulfonate relative to the content of the amine derivative and/or the salt thereof is less than the lower limit, there is a tendency that the aqueous suspension-form pesticidal composition is insufficient in dispersibility and settles, and the redispersibility also deteriorates. On the other hand, even when the upper limit is exceeded, further improvement of effects cannot be expected, which is not preferable from the economical aspect.

Examples of the aqueous dispersion medium contained in the aqueous suspension-form pesticidal composition of the present invention include, but are not particularly limited to, water such as purified water (deionized water, distilled water, sterile water, and the like), natural water, tap water and raw water; lower alcohols (such as alcohols having 1 to 3 carbon atoms); and mixtures of two or more thereof. Among these, the aqueous dispersion medium according to the present invention is preferably water.

The aqueous suspension-form pesticidal composition of the present invention may further contain a thickener mainly for the purpose of preventing sedimentation of dispersed particles. A water soluble polymer can be used as the thickener, for example. Specific examples thereof include xanthan gum, guar gum, carrageenans, carboxymethyl cellulose, polyvinyl pyrrolidone, carboxyvinyl polymers, and one of them may be used alone, or a mixture of two or more thereof may be used. Preferable among the above is xanthan gum.

When the amine derivative and/or the salt thereof and the highly-purified and partially-desulfonated lignosulfonate are further combined with a thickener (more preferably xanthan gum), the present invention tends to make it possible to simultaneously achieve good suspension, easy redispersibility, and particle diameter growth suppression in particular.

The content (blending amount) of the thickener in the aqueous suspension-form pesticidal composition of the present invention (when the thickener is a mixture of two or more kinds, the total amount of them, and the same applies hereinafter) is preferably 0.05 to 3% by weight, more preferably 0.1 to 3% by weight, and further preferably 0.1 to 1% by weight relative to the total weight of the aqueous suspension-form pesticidal composition.

The aqueous suspension-form pesticidal composition of the present invention can be blended with auxiliary agents such as wetting agents, antifreezing agents, antifoaming agents, and antifungal agents, as long as the effects of the present invention are not impaired.

Examples of the wetting agents include anionic surfactants. Examples of the anionic surfactants include dialkyl sulfosuccinates, alkyl benzene sulfonates, alkyl naphthalene sulfonates, and alkyl sulfates. Note that surfactants of lignosulfonates are not included in the anionic surfactants. As the dialkyl sulfosuccinates, preferably, the alkyl group has 8 to 12 carbon atoms, and the salt is sodium, calcium, or magnesium. As the alkyl benzene sulfonates, preferably, the alkyl group has 12 carbon atoms, and the salt is sodium, calcium, magnesium, ammonium, or triethanolamine. As the alkyl naphthalene sulfonates, preferably, the alkyl group is a monoalkyl group or a dialkyl group, and the salt is sodium, calcium, magnesium, ammonium, or triethanolamine. As the alkyl sulfates, preferably, the alkyl group has 12 to 18 carbon atoms, and the salt is sodium, ammonium, or triethanolamine. Among the above, the wetting agent is preferably at least one selected from the group consisting of dioctyl sulfosuccinate, dodecyl benzene sulfonate, diisopropyl naphthalene sulfonate, and sodium lauryl sulfate.

When the aqueous suspension-form pesticidal composition of the present invention further contains the wetting agent, the blending amount (in the case of a mixture of two or more kinds, the total amount of them) is 0.1 to 5% by weight relative to the total weight of the aqueous suspension-form pesticidal composition.

The antifreezing agent is blended mainly for the purpose of lowering the freezing point to prevent freezing. Examples of the antifreezing agent include ethylene glycol, propylene glycol, glycerin, polyethylene glycol, and polypropylene glycol. Among the above, propylene glycol is particularly preferable.

When the aqueous suspension-form pesticidal composition of the present invention further contains the antifreezing agent, the blending amount (in the case of a mixture of two or more kinds, the total amount of them) is 0.5 to 15% by weight relative to the total weight of the aqueous suspension-form pesticidal composition.

Since foaming is likely to occur when the surfactant is blended, the antifoaming agent is blended mainly for the purpose of suppressing this foaming. Although the type of the antifoaming agent is not particularly limited, preferable examples of the antifoaming agent include emulsion type and oil compound type silicone-based antifoaming agents containing dimethylpolysiloxane as an active ingredient. Among them, O/W emulsion type antifoaming agents obtained by emulsifying a silicone oil compound, which is easy to handle and highly safe, with a nonionic surfactant are more suitable for use. Specific examples of antifoaming agents usable include emulsion type silicone-based antifoaming agents KM-73 and KF-72 (manufactured by Shin-Etsu Chemical Co., Ltd.) and oil compound type silicone-based antifoaming agents KS-66 and KS-69 (manufactured by Shin-Etsu Chemical Co., Ltd.).

When the aqueous suspension-form pesticidal composition of the present invention further contains the antifoaming agent, the blending amount (in the case of a mixture of two or more kinds, the total amount of them) is 0.1 to 1% by weight relative to the total weight of the aqueous suspension-form pesticidal composition.

Since molds are likely to grow mainly when a thickener being a water soluble polymer is blended, the antifungal agent is blended mainly for the purpose of preventing their propagation. Although the type of the antifungal agent is not particularly limited, it is possible to use, for example, Biohope L (mixture of 5-chloro-2-methyl-4-isothiazolin-3-one, 2-methyl-4-isothiazolin-3-one, and bronopol, manufactured by K•I Chemical Industry Co., Ltd.) or a commonly used preservative. The amount of the antifungal agent blended can be suitably adjusted according to the kind, use purpose, and the like.

In addition, the aqueous suspension-form pesticidal composition of the present invention can be appropriately blended with e.g. fertilizers and other pesticidal active ingredients such as insecticides, fungicides, acaricides, nematicides, and plant growth regulators, as long as the effects of the present invention are not impaired. The blending amount in this case can be suitably adjusted according to the kind, purpose, and the like.

The method for producing the aqueous suspension-form pesticidal composition of the present invention is not particularly limited, and it can be produced according to a conventional method for producing a flowable formulation. For example, to a predetermined amount of the aqueous dispersion medium, the amine derivative and/or the salt thereof, the highly-purified and partially-desulfonated lignosulfonate, and the wetting agent as needed are added, and then a wet grinding mill is used to prepare a slurry having a volume average particle diameter of about 25 μm. The wet grinding mill is not particularly limited, and it is possible to use, for example, a bead mill, a sand mill, or the like. In the case of using a bead mill, it is preferable to use glass beads having a size of around 1 mm. In addition, this slurry can be appropriately added with the antifreeze agent, the antifoaming agent, the thickener, the antifungal agent, and the like, as necessary.

In the aqueous suspension-form pesticidal composition of the present invention, particle diameter growth of the pesticidal active ingredient is sufficiently suppressed. For example, the aqueous suspension-form pesticidal composition of the present invention can maintain the volume average particle diameter (particle diameter of the particles containing the pesticidal active ingredient) in a range of 1 to 5 μm and more preferably in a range of 1.5 to 4.5 μm under the conditions after 1 month preservation at 54° C. with a solid content of 1 to 80% by weight in the aqueous dispersion medium.

In addition, the aqueous suspension-form pesticidal composition of the present invention has a viscosity (model B viscometer, 20° C., 60 rpm) of preferably 100 to 1,000 mPa·s, and has a viscosity of more preferably 100 to 500 mPa·s in consideration of pouring the content from a container such as a bottle.

The aqueous suspension-form pesticidal composition of the present invention exhibits a pest control effect. Examples of pests include agricultural and horticultural pests. Examples of agricultural and horticultural pests include lepidopteran pests, hemipteran pests, coleopteran pests, hymenopteran pests, orthopteran pests, dipteran pests, acarina pests, Thysanoptera pests, and nematodes.

The aqueous suspension-form pesticidal composition of the present invention can be applied to the above-described pests, plants (such as seeds, plant stems and leaves, roots, sprouted plants, and young plants), plant propagation bodies, materials for cultivation, soil, nutrient solution in nutriculture, solid medium in nutriculture, areas requiring prevention of pest invasion, and the like. These applications can be done before and after the invasion of pests.

When the aqueous suspension-form pesticidal composition of the present invention is applied to a plant, the aqueous suspension-form pesticidal composition can be used as a soil treatment agent, a foliage treatment agent, a pre-sowing seed treatment agent, a treatment agent for plants before transplantation, a treatment agent for plants at the time of transplantation, or the like.

In addition, the aqueous suspension-form pesticidal composition of the present invention can be appropriately used in combination with e.g. fertilizers and other pesticidal active ingredients such as insecticides, fungicides, acaricides, nematicides, and plant growth regulators as described above.

The amount used of the aqueous suspension-form pesticidal composition of the present invention is not particularly limited, and can be appropriately selected depending on the application scene, application timing, application method, target plant, target pest, or the like. For example, the amount used per 10 ares may be in a range of 1 to 5,000 ppm and in a range of preferably 10 to 1,000 ppm, in terms of the amount used of the amine derivative and/or the salt thereof (amount of the amine derivative represented by the general formula (1) or the salt thereof in terms of free form, or the total amount of them when both are used, and the same applies hereinafter). The aqueous suspension-form pesticidal composition of the present invention can be dispersed as an undiluted solution or after being diluted with an aqueous dispersion medium to an appropriate concentration. The amount diluted at the time of dilution can also be appropriately selected according to the purpose.

EXAMPLES

Examples of the present invention are specifically provided below, but the present invention is not limited by these examples.

Production Examples (Examples) 1 to 10, which are examples of the aqueous suspension-form pesticidal composition of the present invention, and Comparative Examples 1 to 10, which are comparative production examples, are provided below. The pesticidal active ingredient used in Production Examples and Comparative Examples to be described later was N-[1-((6-chloropyridin-3-yl)methyl)pyridin-2(1H)-ylidene]-2,2,2-trifluoroacetamide.

Production Example 1

The pesticidal active ingredient (purity 99.7%: hereinafter the same purity) in an amount of 17 parts by weight, highly-purified and partially-desulfonated sodium lignosulfonate (trade name: VANILLEX G, manufactured by NIPPON PAPER INDUSTRIES CO., LTD.) in an amount of 8.3 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water (deionized water, hereinafter the same) in an amount of 56.84 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 20 parts by weight as well as water in an amount of 20 parts by weight were mixed to obtain a composition of Production Example 1.

Production Example 2

The pesticidal active ingredient in an amount of 17 parts by weight, highly-purified and partially-desulfonated sodium lignosulfonate (trade name: New Kargen RX-B, manufactured by TAKEMOTO OIL & FAT Co., Ltd.) in an amount of 8.3 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 56.84 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 20 parts by weight as well as water in an amount of 20 parts by weight were mixed to obtain a composition of Production Example 2.

Production Example 3

The pesticidal active ingredient in an amount of 17 parts by weight, highly-purified and partially-desulfonated sodium lignosulfonate (trade name: VANILLEX G, manufactured by NIPPON PAPER INDUSTRIES CO., LTD.) in an amount of 8.3 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 56.84 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 30 parts by weight as well as water in an amount of 10 parts by weight were mixed to obtain a composition of Production Example 3.

Production Example 4

The pesticidal active ingredient in an amount of 17 parts by weight, highly-purified and partially-desulfonated sodium lignosulfonate (trade name: VANILLEX G, manufactured by NIPPON PAPER INDUSTRIES CO., LTD.) in an amount of 8.3 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 56.84 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 40 parts by weight were mixed to obtain a composition of Production Example 4.

Production Example 5

The pesticidal active ingredient in an amount of 17 parts by weight, highly-purified and partially-desulfonated sodium lignosulfonate (trade name: VANILLEX G, manufactured by NIPPON PAPER INDUSTRIES CO., LTD.) in an amount of 6.7 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 58.44 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 30 parts by weight as well as water in an amount of 10 parts by weight were mixed to obtain a composition of Production Example 5.

Production Example 6

The pesticidal active ingredient in an amount of 17 parts by weight, highly-purified and partially-desulfonated sodium lignosulfonate (trade name: VANILLEX G, manufactured by NIPPON PAPER INDUSTRIES CO., LTD.) in an amount of 5 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 60.14 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 30 parts by weight as well as water in an amount of 10 parts by weight were mixed to obtain a composition of Production Example 6.

Production Example 7

The pesticidal active ingredient in an amount of 17 parts by weight, highly-purified and partially-desulfonated sodium lignosulfonate (trade name: VANILLEX G, manufactured by NIPPON PAPER INDUSTRIES CO., LTD.) in an amount of 3.3 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 61.84 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 30 parts by weight as well as water in an amount of 10 parts by weight were mixed to obtain a composition of Production Example 7.

Production Example 8

The pesticidal active ingredient in an amount of 17 parts by weight, highly-purified and partially-desulfonated sodium lignosulfonate (trade name: VANILLEX G, manufactured by NIPPON PAPER INDUSTRIES CO., LTD.) in an amount of 1.7 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 63.44 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 30 parts by weight as well as water in an amount of 10 parts by weight were mixed to obtain a composition of Production Example 8.

Production Example 9

The pesticidal active ingredient in an amount of 17 parts by weight, highly-purified and partially-desulfonated sodium lignosulfonate (trade name: New Kargen RX-B, manufactured by TAKEMOTO OIL & FAT Co., Ltd.) in an amount of 4.2 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 60.94 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 30 parts by weight as well as water in an amount of 10 parts by weight were mixed to obtain a composition of Production Example 9.

Production Example 10

The pesticidal active ingredient in an amount of 50 parts by weight, highly-purified and partially-desulfonated sodium lignosulfonate (trade name: New Kargen RX-B, manufactured by TAKEMOTO OIL & FAT Co., Ltd.) in an amount of 2.5 parts by weight, propylene glycol (manufactured by ADEKA CORPORATION) in an amount of 1 part by weight, dioctyl sulfosuccinate (trade name: Airroll CT-1L, manufactured by TOHO Chemical Industry Co., Ltd.) in an amount of 0.25 parts by weight, KM-73 (manufactured by Shin-Etsu Chemical Co., Ltd.) in an amount of 0.2 parts by weight, xanthan gum (trade name: KELZAN, manufactured by SANSHO Co., Ltd.) in an amount of 0.1 parts by weight, and water in an amount of 45.95 parts by weight were mixed, followed by wet grinding with a bead mill (glass beads of diameter 1 mm) to obtain a slurry (solution A). Next, propylene glycol (manufactured by ADEKA CORPORATION) in an amount of 21 parts by weight, KM-73 (manufactured by Shin-Etsu Chemical Co., Ltd.) in an amount of 0.2 parts by weight, xanthan gum (trade name: KELZAN S, manufactured by SANSHO Co., Ltd.) in an amount of 0.1 parts by weight, Biohope L in an amount of 0.12 parts by weight, and water in an amount of 78.58 parts by weight were mixed and dissolved to obtain an aqueous solution (solution B). The thus-prepared solution A and solution B respectively in an amount of 80 parts by weight and in an amount of 20 parts by weight were mixed to obtain a composition of Production Example 10.

Comparative Example 1

The pesticidal active ingredient in an amount of 17 parts by weight, sodium lignosulfonate (trade name: SanX P-252, manufactured by NIPPON PAPER INDUSTRIES CO., LTD.) in an amount of 8.3 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 56.84 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 20 parts by weight as well as water in an amount of 20 parts by weight were mixed to obtain a composition of Comparative Example 1.

Comparative Example 2

The pesticidal active ingredient in an amount of 17 parts by weight, sodium lignosulfonate (trade name: New Kargen WG-4, manufactured by TAKEMOTO OIL & FAT Co., Ltd.) in an amount of 8.3 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 56.84 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 20 parts by weight as well as water in an amount of 20 parts by weight were mixed to obtain a composition of Comparative Example 2.

Comparative Example 3

The pesticidal active ingredient in an amount of 17 parts by weight, magnesium lignosulfonate (trade name: SanX P-321, manufactured by NIPPON PAPER INDUSTRIES CO., LTD.) in an amount of 8.3 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 56.84 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 20 parts by weight as well as water in an amount of 20 parts by weight were mixed to obtain a composition of Comparative Example 3.

Comparative Example 4

The pesticidal active ingredient in an amount of 17 parts by weight, polyoxyethylene (19) tristyryl phenyl ether sulfate ammonium salt (trade name: Sorpol T-20 SPG, manufactured by TOHO Chemical Industry Co., Ltd.) in an amount of 8.3 parts by weight, propylene glycol (manufactured by ADEKA CORPORATION) in an amount of 5 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 65.14 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 20 parts by weight as well as water in an amount of 20 parts by weight were mixed to obtain a composition of Comparative Example 4.

Comparative Example 5

The pesticidal active ingredient in an amount of 17 parts by weight, sodium lignosulfonate (trade name: New Kargen FS-72PG, manufactured by TAKEMOTO OIL & FAT Co., Ltd.) in an amount of 8.4 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 56.74 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 20 parts by weight as well as water in an amount of 20 parts by weight were mixed to obtain a composition of Comparative Example 5.

Comparative Example 6

The pesticidal active ingredient in an amount of 17 parts by weight, polyoxyethylene allyl phenyl ether phosphate amine salt (trade name: New Kargen FS-3PG, manufactured by TAKEMOTO OIL & FAT Co., Ltd.) in an amount of 8.4 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 56.74 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 20 parts by weight as well as water in an amount of 20 parts by weight were mixed to obtain a composition of Comparative Example 6.

Comparative Example 7

The pesticidal active ingredient in an amount of 17 parts by weight, polyoxyethylene aryl phenyl ether sulfate ammonium salt (trade name: New Kargen FS-7PG, manufactured by TAKEMOTO OIL & FAT Co., Ltd.) in an amount of 8.4 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 56.74 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 20 parts by weight as well as water in an amount of 20 parts by weight were mixed to obtain a composition of Comparative Example 7.

Comparative Example 8

The pesticidal active ingredient in an amount of 17 parts by weight, polyoxyalkylene allyl phenyl ether (trade name: New Kargen FS-1, manufactured by TAKEMOTO OIL & FAT Co., Ltd.) in an amount of 4.2 parts by weight, propylene glycol (manufactured by ADEKA CORPORATION) in an amount of 16.7 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 60.94 parts by weight were mixed, followed by wet grinding with a bead mill (glass beads of diameter 1 mm) to obtain a slurry (solution A). Next, xanthan gum (trade name: KELZAN S, manufactured by SANSHO Co., Ltd.) in an amount of 1 part by weight, Biohope L in an amount of 0.1 parts by weight, and water in an amount of 98.9 parts by weight were mixed and dissolved to obtain an aqueous solution (solution B). The thus-prepared solution A and solution B respectively in an amount of 60 parts by weight and in an amount of 20 parts by weight as well as water in an amount of 20 parts by weight were mixed to obtain a composition of Comparative Example 8.

Comparative Example 9

The pesticidal active ingredient in an amount of 17 parts by weight, sodium polycarboxylate (trade name: New Kargen WG-5, manufactured by TAKEMOTO OIL & FAT Co., Ltd.) in an amount of 8 parts by weight, propylene glycol (manufactured by ADEKA CORPORATION) in an amount of 8 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 65.84 parts by weight were mixed, followed by wet grinding with a bead mill (glass beads of diameter 1 mm) to obtain a slurry (solution A). Next, xanthan gum (trade name: KELZAN ASX, manufactured by SANSHO Co., Ltd.) in an amount of 1 part by weight and water in an amount of 99.0 parts by weight were mixed and dissolved to obtain an aqueous solution (solution B). The thus-prepared solution A and solution B respectively in an amount of 60 parts by weight and in an amount of 20 parts by weight as well as water in an amount of 20 parts by weight were mixed to obtain a composition of Comparative Example 9.

Comparative Example 10

The pesticidal active ingredient in an amount of 17 parts by weight, polyoxyethylene tristyryl phenyl ether (trade name: Sorpol T-10, manufactured by TOHO Chemical Industry Co., Ltd.) in an amount of 8 parts by weight, propylene glycol (manufactured by ADEKA CORPORATION) in an amount of 8 parts by weight, dioctyl sulfosuccinate (trade name: Airroll CT-1L, manufactured by TOHO Chemical Industry Co., Ltd.) in an amount of 0.33 parts by weight, KM-73 (manufactured by Shin-Etsu Chemical Co., Ltd.) in an amount of 0.83 parts by weight, and water in an amount of 65.84 parts by weight were mixed, followed by wet grinding with a bead mill (glass beads of diameter 1 mm) to obtain a slurry (solution A). Next, xanthan gum (trade name: KELZAN ASX, manufactured by SANSHO Co., Ltd.) in an amount of 1 part by weight and water in an amount of 99.0 parts by weight were mixed and dissolved to obtain an aqueous solution (solution B). The thus-prepared solution A and solution B respectively in an amount of 60 parts by weight and in an amount of 20 parts by weight as well as water in an amount of 20 parts by weight were mixed to obtain a composition of Comparative Example 10.

(Test Example 1) Initial Physical Property Measurement of Composition

The compositions obtained in Production Examples 1 to 10 and Comparative Examples 1 to 10 were each subjected to measurement of volume average particle diameter (average particle diameter (μm)) before change over time (immediately after production) by use of a laser diffraction type particle diameter distribution measuring apparatus (SALD-2200 manufactured by Shimadzu Corporation). In addition, each of the compositions was kept at 20° C., 10 mL of the composition was placed in a stainless steel container, and the viscosity (mPa·s) was measured with a model B viscometer (Vismetron VDA-2, rotor speed: 60 rpm, manufactured by Shibaura Systems Co., Ltd.). The upper part of each of the following Table 1 and Table 2 presents the results.

(Test Example 2) Stress Test of Compositions

The compositions obtained in Production Examples 1 to 10 and Comparative Examples 1 to 10 were each stored at 54° C. for 1 month and subjected to measurements of volume average particle diameter and viscosity after storage. Each measurement method was the same as that of Test Example 1. The lower part of each of the following Table 1 and Table 2 presents the results. Note that the volume average particle diameters of Comparative Examples 1 to 4 were measured at a storage period of 0.5 months. In addition, in Comparative Examples 9 and 10, the redispersibility deteriorated due to caking and separation, and thus the measurement was stopped.

tion showed no significant change in volume average particle diameter immediately after production and after stress test (after storage) under other stress test conditions of, for example, storage for 1 month at 40° C. and storage for 2 weeks at 54° C.

(Efficacy Test 1)

<Pesticidal Effect Test for Small Brown Planthoppers>

The composition of Production Example 9 was used, and the concentration of the drug solution was adjusted with water such that the amount of the pesticidal active ingredient used per 1 ha was 30 g, 50 g, and 75 g. The drug solution was sprayed onto a paddy field (24 m$^2$/section) using a sprayer so that the amount of the drug solution was 150 L per 10 a. The control agents used were Bestguard water soluble agent (active ingredient: nitenpyram, manufacturer: Sumitomo Chemical Co., Ltd.) and Chess granulated water dispersible powder (active ingredient: pymetrozine, manufacturer: Syngenta).

At days 4, 7, 13, 19, and 34 after the spraying, 30 strains of rice were selected from the paddy field to investigate the number of larvae of small brown planthopper which had infested the selected strains. Investigation was conducted for each number of days after spraying, and the corrected density index per section was determined by the following formula:

Corrected density index=(number of larvae per treated section/number of larvae in treated section before spraying)×(number of larvae in untreated section before spraying/number of larvae in untreated section)×100 to confirm the insecticidal effect.

Note that the corrected density index shows an occurrence ratio for each section when the density in the untreated section at investigation is set to 100 in consideration of the

TABLE 1

| | | Production Example | | | | | | | | | |
|---|---|---|---|---|---|---|---|---|---|---|---|
| Test Number | Measurement Item | 1 | 2 | 3 | 4 | 5 | 6 | 7 | 8 | 9 | 10 |
| Test Example 1 | Average Particle Diameter (μm) | 2.2 | 1.7 | 2.3 | 2.1 | 1.8 | 1.9 | 2.0 | 2.2 | 2.3 | 4.2 |
| | Viscosity (mPa·s) | 148 | 146 | 257 | 376 | 251 | 249 | 241 | 231 | 217 | 113 |
| Test Example 2 | Average Particle Diameter (μm) | 2.6 | 2.3 | 2.6 | 2.4 | 2.1 | 2.1 | 2.2 | 2.8 | 2.7 | 4.4 |
| | Viscosity (mPa·s) | 206 | 210 | 322 | 442 | 300 | 276 | 256 | 232 | 243 | 109 |

TABLE 2

| | | Comparative Example | | | | | | | | | |
|---|---|---|---|---|---|---|---|---|---|---|---|
| Test Number | Measurement Item | 1 | 2 | 3 | 4 | 5 | 6 | 7 | 8 | 9 | 10 |
| Test Example 1 | Average Particle Diameter (μm) | 2.9 | 3.0 | 2.8 | 1.8 | 2.4 | 2.4 | 2.5 | 2.5 | 4.1 | 1.7 |
| | Viscosity (mPa·s) | 335 | 346 | 293 | — | 220 | 225 | 224 | 212 | — | — |
| Test Example 2 | Average Particle Diameter (μm) | 9.0 | 8.1 | 7.0 | 5.5 | 7.7 | 7.9 | 8.8 | 8.1 | Unmeasurable | Unmeasurable |
| | Viscosity (mPa·s) | — | — | — | — | 213 | 201 | 219 | 198 | Unmeasurable | Unmeasurable |

As presented in Tables 1 and 2, in each production example, the aqueous suspension-form pesticidal composition of the present invention showed no significant change in volume average particle diameter immediately after production and after stress test (after storage). On the other hand, in each comparative example, the composition showed a significant increase in volume average particle diameter after storage, and it was difficult to be used as a formulation. In addition, in each production example, the aqueous suspension-form pesticidal composition of the present invendensity difference before spraying, and indicates that the lower the value, the less the occurrence of pests.

<Test Results>

Table 3 below presents the test results (corrected density index). Table 3 shows that the aqueous suspension-form pesticidal composition of the present invention in Preparation Example 9 is superior in immediate effect to the control agents, which are conventional agents. In addition, regarding the residual effect, it has also been revealed that the composition is superior to the control drug Bestguard water soluble agent, and comparable to Chess granulated water dispersible powder. In addition, it has been revealed that, even after the above-described stress test, the aqueous suspension-form pesticidal composition of the present invention exhibits the same pesticidal effect as above on small brown planthoppers.

TABLE 3

| Sample Name | Amount Used (g ai/ha) | After 4 Days | After 7 Days | After 13 Days | After 19 Days | After 34 Days |
|---|---|---|---|---|---|---|
| Production Example 9 | 75 | 0 | 1 | 1 | 2 | 5 |
|  | 50 | 2 | 6 | 6 | 6 | 11 |
|  | 30 | 4 | 7 | 8 | 12 | 28 |
| Bestguard Water Soluble Agent | 50 | 19 | 28 | 45 | 64 | 76 |
| Chess Granulated Water Dispersible Powder | 150 | 24 | 6 | 1 | 2 | 5 |

(Efficacy Test 2)

<Pesticidal Effect Test for Green Rice Leafhoppers>

The composition of Production Example 9 was used, and the concentration of the drug solution was adjusted with water such that the amount of the pesticidal active ingredient used per 1 ha was 30 g, 50 g, and 75 g. The drug solution was sprayed onto a paddy field (24 m²/section) using a sprayer so that the amount of the drug solution was 150 L per 10 a. The control agent used was Bestguard water soluble agent.

At days 4, 7, 13, 19, and 34 after the spraying, 30 strains of rice were selected from the paddy field to investigate the number of larvae of green rice leafhopper which had infested the selected strains. Investigation was conducted for each number of days after spraying, and the corrected density index per section was determined by the following formula:

Corrected density index=(number of larvae per treated section/number of larvae in treated section before spraying)×(number of larvae in untreated section before spraying/number of larvae in untreated section)×100 to confirm the insecticidal effect.

<Test Results>

Table 4 below presents the test results (corrected density index). Table 4 shows that the aqueous suspension-form pesticidal composition of the present invention in Preparation Example 9 exhibits the same immediate effect as the control agent, which is a conventional agent. In addition, it has been revealed that the aqueous suspension-form pesticidal composition of the present invention is high in residual effect even after 34 days after treatment, and is superior to the control agent Bestguard water soluble agent. In addition, it has been revealed that, even after the above-described stress test, the aqueous suspension-form pesticidal composition of the present invention exhibits the same pesticidal effect as above on green rice leafhoppers.

TABLE 4

| Sample Name | Amount Used (g ai/ha) | After 4 Days | After 7 Days | After 13 Days | After 19 Days | After 34 Days |
|---|---|---|---|---|---|---|
| Production Example 9 | 75 | 0 | 0 | 0 | 0 | 1 |
|  | 50 | 0 | 0 | 1 | 0 | 1 |
|  | 30 | 2 | 3 | 0 | 3 | 14 |
| Bestguard Water Soluble Agent | 50 | 0 | 1 | 9 | 12 | 65 |

INDUSTRIAL APPLICABILITY

As described above, the aqueous suspension-form pesticidal composition of the present invention is combined with a highly-purified and partially-desulfonated lignosulfonate, which enables long-term stable dispersion of at least one pesticidal active ingredient selected from the group consisting of amine derivatives represented by the general formula (1) and salts thereof, sufficiently suppressing particle diameter growth during the storage period and stably maintaining its excellent pest control effect. Therefore, the present invention makes it possible to provide an aqueous suspension-form pesticidal composition which is excellent in pest control effect and which sufficiently suppresses particle diameter growth of the pesticidal active ingredient and reduction of the pest control effect and thus is excellent in stability over time.

The invention claimed is:

1. An aqueous suspension-form pesticidal composition comprising:
at least one pesticidal active ingredient selected from the group consisting of amine derivatives represented by the following general formula (1) and salts thereof; a highly-purified and partially-desulfonated lignosulfonate; and an aqueous dispersion medium

[Chemical Formula 1]

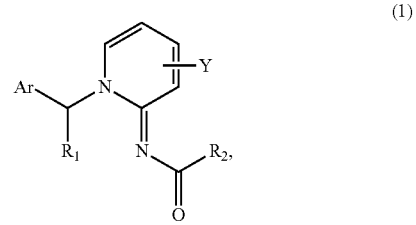

(1)

in the general formula (1),

Ar represents a pyridyl group optionally substituted with a halogen atom, a C1-6 alkyl group optionally substituted with a halogen atom, a C1-6 alkyloxy group optionally substituted with a halogen atom, a hydroxyl group, a cyano group, or a nitro group; or a pyrimidyl group optionally substituted with a halogen atom, a C1-6 alkyl group optionally substituted with a halogen atom, a C1-6 alkyloxy group optionally substituted with a halogen atom, a hydroxyl group, a cyano group, or a nitro group, $R_1$ represents a hydrogen atom or a C1-6 alkyl group, Y represents a hydrogen atom, a halogen atom, a hydroxyl group, a C1-6 alkyl group optionally substituted with a halogen atom, a C1-6 alkyloxy group optionally substituted with a halogen atom a cyano group, a formyl group, or a nitro group, and R₂ represents a C1-6 alkyl group substituted with at least one halogen.

2. The aqueous suspension-form pesticidal composition according to claim 1, wherein the amine derivative is at least one selected from the group consisting of N-[1-((6-chloropyridin-3-yl)methyl)pyridin-2(1H)-ylidene]-2,2,2-trifluoroacetamide, N-[1-((6-chloro-5-fluoropyridin-3-yl)methyl)pyridin-2(1H)-ylidene]-2,2,2-trifluoroacetamide, N-[1-((6-bromopyridin-3-yl)methyl)pyridin-2(1H)-ylidene]-2,2,2-trifluoroacetamide, N-[1-(1-(6-chloropyridin-3-yl)ethyl)pyridin-2(1H)-ylidene]-2,2,2-trifluoroacetamide, N-[1-((6-chloropyridin-3-yl)methyl)pyridin-2(1H)-ylidene]-2,2-difluoroacetamide, 2-chloro-N-[1-((6-chloropyridin-3-yl)methyl)pyridin-2(1H)-ylidene]-2,2-difluoroacetamide, N-[1-((2-chloropyrimidin-5-yl)methyl)pyridin-2(1H)-ylidene]-2,2,2-trifluoroacetamide, and N-[1-((6-chloropyridin-3-yl)methyl)pyridin-2(1H)-ylidene]-2,2,3,3,3-pentafluoropropanamide.

3. The aqueous suspension-form pesticidal composition according to claim 1, wherein an amount of the highly-purified and partially-desulfonated lignosulfonate blended is 1 to 5% by weight.

4. The aqueous suspension-form pesticidal composition according to claim 1, further comprising a thickener.

5. The aqueous suspension-form pesticidal composition according to claim 4, wherein the thickener is at least one selected from the group consisting of xanthan gum, guar gum, carrageenans, carboxymethyl cellulose, polyvinyl pyrrolidone, and carboxyvinyl polymers.

6. The aqueous suspension-form pesticidal composition according to claim 2, further comprising a thickener.

7. The aqueous suspension-form pesticidal composition according to claim 3, further comprising a thickener.

* * * * *